US012333697B2

(12) United States Patent
Osunkwo et al.

(10) Patent No.: US 12,333,697 B2
(45) Date of Patent: Jun. 17, 2025

(54) NEURAL NETWORK ARCHITECTURE FOR AUTOMATED PART INSPECTION

(71) Applicants: TE Connectivity Services GmbH, Schaffhausen (CH); Tyco Electronics (Shanghai) Co., Ltd., Shanghai (CN); Tyco Electronics Mexico, S. de R.L. de C.V., Tlalnepantla (MX)

(72) Inventors: Sonny O. Osunkwo, Harrisburg, PA (US); Roberto Francisco-Yi Lu, Bellevue, WA (US); Jiankun Zhou, Middletown, PA (US); Lei Zhou, Shanghai (CN); Angel Alberto Slistan, Hermosillo Sonora (MX); Dandan Zhang, Shanghai (CN)

(73) Assignees: TE Connectivity Solutions Gmbh (CH); Tyco Electronics Co., Ltd (CN); Tyco Electronics Mexico, S. de R.L. de C.V. (MX)

( * ) Notice: Subject to any disclaimer, the term of this patent is extended or adjusted under 35 U.S.C. 154(b) by 737 days.

(21) Appl. No.: 17/317,940

(22) Filed: May 12, 2021

(65) Prior Publication Data
US 2022/0318982 A1 Oct. 6, 2022

(30) Foreign Application Priority Data

Apr. 2, 2021 (CN) .......................... 202110359833.7

(51) Int. Cl.
G06T 7/00 (2017.01)
G06N 3/04 (2023.01)

(52) U.S. Cl.
CPC ............. G06T 7/0004 (2013.01); G06N 3/04 (2013.01); G06T 2207/20084 (2013.01); G06T 2207/30164 (2013.01)

(58) Field of Classification Search
CPC ......... G06T 7/0004; G06T 2207/20084; G06T 2207/30164; G06T 2207/20081;
(Continued)

(56) References Cited

U.S. PATENT DOCUMENTS

2019/0080446 A1* 3/2019 Kuzmin ............... G06V 30/144

OTHER PUBLICATIONS

Ma, Can, JianXu Mao, and JianPing Mao. "Research and develop on PCB defect intelligent visual inspection robot." 2012 Symposium on Photonics and Optoelectronics. IEEE, 2012. (Year: 2012).*
(Continued)

Primary Examiner — Amandeep Saini
Assistant Examiner — Denise G Alfonso

(57) ABSTRACT

A part inspection system is provided and includes a vision device configured to image a part is inspected and generate a digital image of the part. The part inspection system includes a part inspection module coupled to the vision device and receiving the digital image of the part. The part inspection module includes a memory for storing a neural network architecture having a plurality of convolutional layers, a plurality of pooling layers disposed after different convolutional layers and spaced apart from each other, at least one random noise generation layer downstream of the convolutional layers and the pooling layers, and an output layer. The part inspection module includes a processor configured to analyze the digital image through the layers of the neural network architecture to output one of a defective output or a non-defective output based on the image analysis of the digital image through the neural network architecture.

16 Claims, 2 Drawing Sheets

(58) Field of Classification Search
CPC ........ G06N 3/04; G06N 3/0464; G06N 3/047; G06N 3/084; G06N 3/08
See application file for complete search history.

(56) References Cited

OTHER PUBLICATIONS

Nagata, Fusaomi, et al. "Defect detection method using deep convolutional neural network, support vector machine and template matching techniques." Artificial Life and Robotics 24 (2019): 512-519. (Year: 2019).*

Natarajan, Vidhya, et al. "Convolutional networks for voting-based anomaly classification in metal surface inspection." 2017 IEEE International Conference on Industrial Technology (ICIT). IEEE, 2017. (Year: 2017).*

Balzategui, Julen, et al. "Semi-automatic quality inspection of solar cell based on Convolutional Neural Networks." 2019 24th IEEE International Conference on Emerging Technologies and Factory Automation (ETFA). IEEE, 2019. (Year: 2019).*

* cited by examiner

NEURAL NETWORK ARCHITECTURE FOR AUTOMATED PART INSPECTION

CROSS REFERENCE TO RELATED APPLICATIONS

This application claims benefit to Chinese Application No. 202110359833.7, filed 2 Apr. 2021, the subject matter of which is herein incorporated by reference in its entirety.

BACKGROUND OF THE INVENTION

The subject matter herein relates generally to part inspection systems and methods.

With the development of image processing technologies, image processing technologies have been applied to defect detection in manufactured products. In practical applications, after one or more manufacturing steps, parts may be imaged and the images analyzed to detect for defects, such as prior to assembly of the part or shipment of the part. Some defects are difficult for known image processing systems to identify. For example, detection of burrs in cross holes in parts after the cutting or drilling process are difficult for some known image processing systems to detect.

A need remains for a robust part inspection system and method.

BRIEF DESCRIPTION OF THE INVENTION

In one embodiment, a part inspection system is provided. The part inspection system includes a vision device configured to image a part is inspected and generate a digital image of the part. The part inspection system includes a part inspection module coupled to the vision device and receiving the digital image of the part. The part inspection module includes a memory for storing a neural network architecture having a plurality of convolutional layers, a plurality of pooling layers disposed after different convolutional layers and spaced apart from each other, at least one random noise generation layer downstream of the convolutional layers and the pooling layers, and an output layer. The part inspection module includes a processor configured to analyze the digital image through the layers of the neural network architecture to output one of a defective output or a non-defective output based on the image analysis of the digital image through the neural network architecture.

In another embodiment, a part inspection system is provided. The part inspection system includes a part support configured to hold a part processed to have a cross hole therethrough. The part support is configured to hold the part in an inspection zone. The part inspection system includes a vision device at the inspection zone. The vision device has a camera configured to image the cross hole and surrounding areas of the part includes any burr defects in the cross hole to generate a digital image of the part. The part inspection system includes a part inspection module coupled to the vision device and receiving the digital image of the part. The part inspection module includes a memory for storing a neural network architecture having a plurality of convolutional layers, a plurality of pooling layers disposed after different convolutional layers and spaced apart from each other, at least one random noise generation layer downstream of the convolutional layers and the pooling layers, and an output layer. The part inspection module includes a processor configured to analyze the digital image through the layers of the neural network architecture to determine if the part includes any burrs in the cross hole. The processor outputting a defective output if burrs are detected based on the image analysis of the digital image through the neural network architecture. The processor outputting a non-defective output if no burrs are detected based on the image analysis of the digital image through the neural network architecture.

In a further embodiment, a part inspection method is provided. The parts inspection method includes imaging a part using a vision device to generate a digital image. The parts inspection method includes analyzing the digital image through a neural network architecture including a plurality of convolutional layers, a plurality of pooling layers disposed after different convolutional layers and spaced apart from each other, at least one random noise generation layer downstream of the convolutional layers and the pooling layers, and an output layer. The parts inspection method includes outputting one of a defective output or a non-defective output based on the image analysis of the digital image through the neural network architecture.

DETAILED DESCRIPTION OF THE INVENTION

Figure 1:
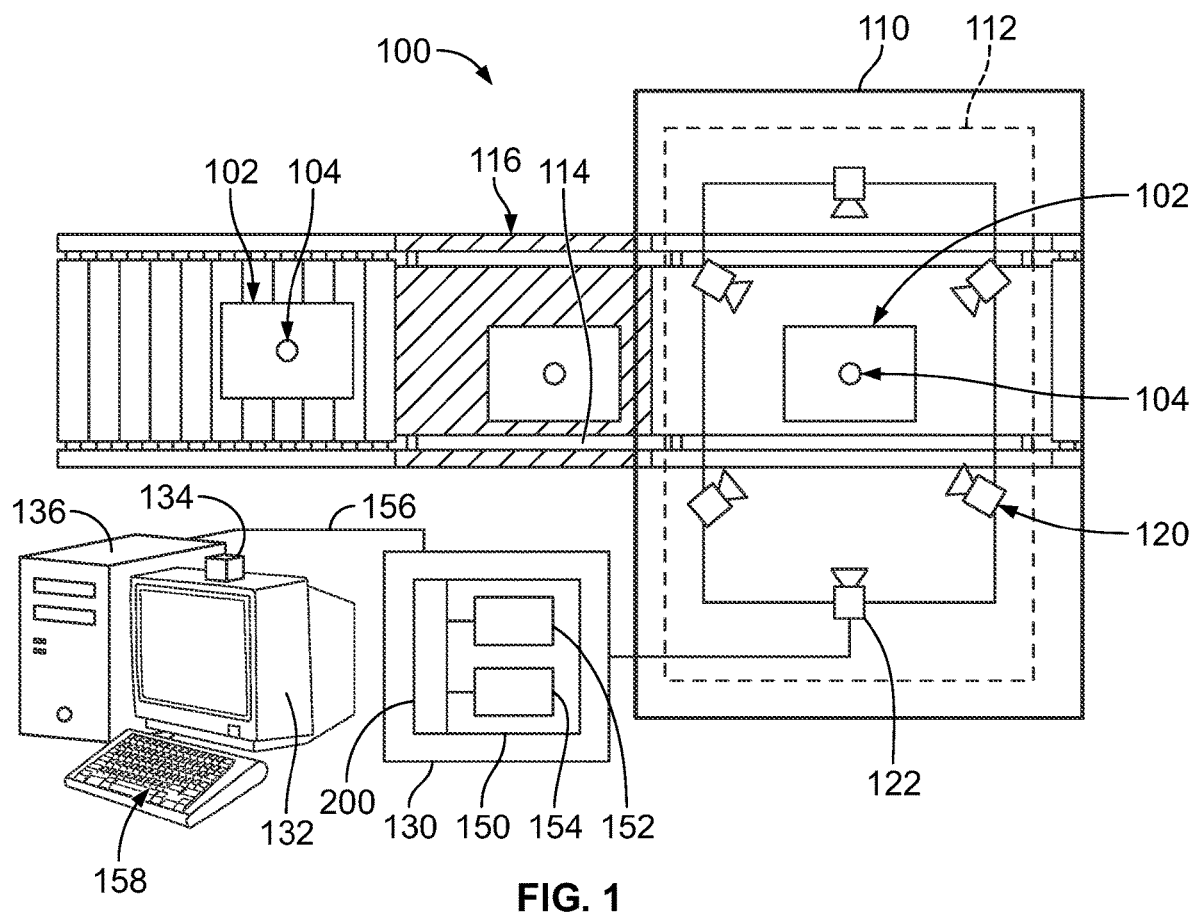
FIG. 1 illustrates a part inspection system in accordance with an exemplary embodiment.

FIG. 1 illustrates a part inspection system 100 in accordance with an exemplary embodiment. The part inspection system 100 is used to inspect parts 102 for defects. In an exemplary embodiment, the part inspection system 100 is a vision inspection system using one or more processors to analyze digital images of the part 102 for defects. The part inspection system 100 may be used to analyze the digital images for one particular type of defect or for multiple, different types of defects. In an exemplary embodiment, the part inspection system 100 is used to inspect the parts 102 for burrs or other types of defects after the part 102 are processed. For example, the part 102 may be drilled, cut, stamped or otherwise processed to remove sections of the part 102. The remaining sections of the part 102 may have burrs or other types of defects. The part inspection system 100 analyzes digital images of the part 102 to detect such burrs.

Figure 2:
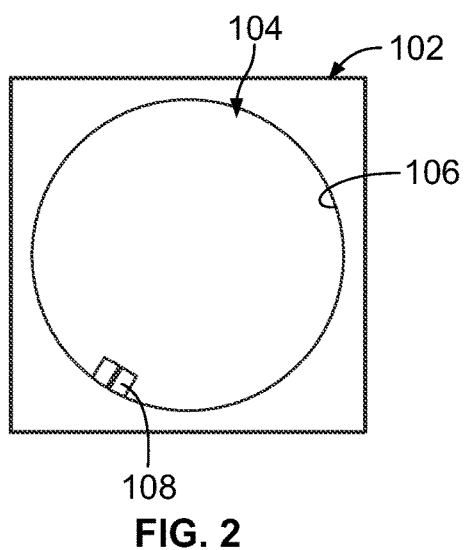
FIG. 2 illustrates an image of a defective part taken by the part inspection system in accordance with an exemplary embodiment.
Figure 3:
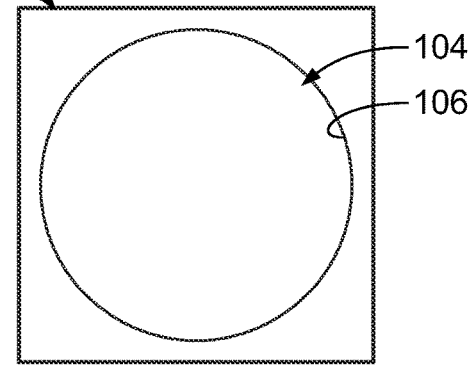
FIG. 3 illustrates an image of a non-defective part taken by the part inspection system in accordance with an exemplary embodiment.

In an exemplary embodiment, the part 102 includes an opening or cross hole 104 and surrounding areas 106 surrounding the cross hole 104. With additional reference to FIGS. 2-3, FIGS. 2-3 are images of parts taken by the part inspection system in accordance with an exemplary embodiment. FIG. 2 illustrates the part having a defect. FIG. 3 illustrates a part without any defects. The cross hole 104 is defined by one or more edges 106 around the cross hole 104. For example, the part 102 may be a terminal, such as a power terminal having the cross hole 104 formed therethrough. The cross hole 104 may receive a wire or a fastener. The cross hole 104 is formed by drilling or cutting through the part 102 to form the cross hole 104. During the perimeter cutting process, burrs 108 may remain around the edges 106 and extend into the cross hole 104. The part inspection system 100 images the part 102 to determine if any of the burrs 108 are present. If present, the part inspection system 100 determines that the part 102 is defective and may discard the part 102 as scrap or for further processing. If absent (no burrs 108 present), the part inspection system 100 validates the part 102 (part is non-defective) for further use or processes. For example, the part 102 may be collected in a bin or transported downstream for assembly.

With reference back to FIG. 1, the part inspection system 100 includes an inspection station 110. The inspection station 110 may be located downstream of a processing station (for example, a stamping machine, a drill press, a cutting machine, and the like) to inspect the part 102 after processing. In other various embodiments, the inspection station 110 may be located at the processing station. The inspection station 110 includes an inspection zone 112.

In an exemplary embodiment, the inspection station 110 includes a locating feature 114 for locating the part 102 relative to the inspection zone 112. The locating feature 114 may be a table or other support platform used to hold and support the part 102 in the inspection station 110. The locating feature 114 may include one or more walls or other features forming datum surfaces for locating the part 102. During use, the part 102 is presented at the inspection zone 112 for inspection. For example, the part 102 may abut against the locating feature 114 to locate the part 102 at the inspection zone 112.

In an exemplary embodiment, the inspection station 110 may include a manipulator 116 for moving the part 102 relative to the inspection station 110. For example, the manipulator 116 may include a conveyor or vibration tray for moving the part 102 through the inspection station 110. In other various embodiments, the manipulator 116 may include a feeder device, such as a feed finger used to advance the part 102, which is held on a carrier, such as a carrier strip. In other various embodiments, the manipulator 116 may include a multiaxis robot configured to move the part 102 in three-dimensional space within the inspection station 110. In alternative embodiments, the manipulator 116 may be an automated guided vehicle (AGV) configured to move the part 102 between various stations. In other alternative embodiments, the part 102 may be manually manipulated and positioned at the inspection zone 102 by hand.

The part inspection system 100 includes a vision device 120 for imaging the part 102 at the inspection zone 112. The vision device 120 may be mounted to a frame or other structure of the inspection station 110. The vision device 120 includes a camera 122 used to image the part 102. The vision device 120 may include other components, such as a lens, a lighting device, and the like.

In an exemplary embodiment, the vision device 120 is operably coupled to a controller 130. The controller 130 may control operation of the vision device 120. For example, the controller 130 may cause the vision device 120 to take an image or retake an image. In various embodiments, the controller 130 may move the camera 122 to a different location, such as to image the part 102 from a different angle. In various embodiments, the controller 130 may be operably coupled to the manipulator 116 to control operation of the manipulator 116. For example, the controller 130 may cause the manipulator 116 to move the part 102 into or out of the inspection station 110. The controller 130 may cause the manipulator 116 to move the part 102 within the inspection station 110, such as to move the part 102 relative to the camera 122.

The part inspection station 110 includes a part inspection module 150 operably coupled to the controller 130. The controller 130 may control operation of the part inspection module 150. In various embodiments, the part inspection module 150 may be embedded in the controller 130 or the part inspection module 150 and the controller 130 may be integrated into a single computing device. The part inspection module 150 receives the digital image of the part 102 from the vision device 120. The part inspection module 150 analyzes the digital image and generates outputs based on the analysis. The output is used by the controller 130, such as for other control functions of the part inspection system 100. In an exemplary embodiment, the part inspection module 150 includes a memory 152 for storing executable instructions and a processor 154 configured to execute the executable instructions stored in the memory 152 to inspect the part 102.

In an exemplary embodiment, the part inspection station 110 includes a neural network architecture 200 for classifying the part 102. The neural network architecture 200 is stored as executable instructions in the memory 152. The processor 154 uses the neural network architecture 200 by executing the stored instructions. The neural network architecture 200 is used for defect detection in an exemplary embodiment. For example, the neural network architecture 200 analyzes the digital images from the vision device 120 to classify the part 102 as defective or non-defective. In an exemplary embodiment, the neural network architecture 200 analyzes the digital images from the vision device 120 to determine if any defects, such as the burrs 108 in the cross hole 104, are present in the images. In an exemplary embodiment, the neural network architecture 200 uses a trained, machine learning artificial intelligence (AI) module to analyze the images. The neural network architecture 200 may be trained using training images. For example, the training images may be images of various parts having cross holes. Some of the training images are images of defective parts, such as those including burrs, while other images are images of non-defective parts, such as those devoid of burrs. The images may be randomly rotated and flipped during training to enhance the machine learning AI training module.

Figure 4:
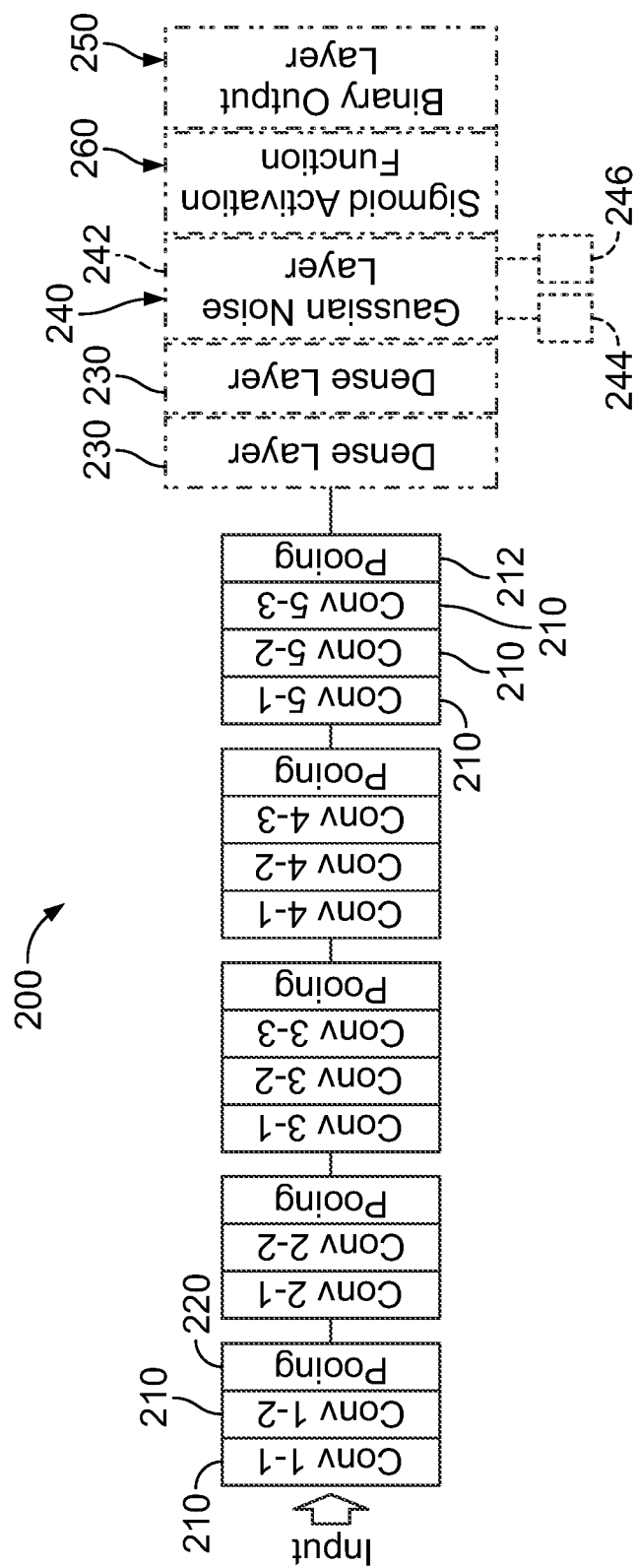
FIG. 4 illustrates the neural network architecture in accordance with an exemplary embodiment.

FIG. 4 illustrates the neural network architecture 200 in accordance with an exemplary embodiment. The neural network architecture 200 is used for defect detection, such as burr detection in cross holes. The neural network architecture 200 is a layered structure. Based on the layer structure of the neural network architecture 200, algorithm processes are performed to achieve defect detection.

The neural network architecture 200 includes a plurality of computer processors that are configured to work together to implement one or more machine learning algorithms. The implementation may be synchronous or asynchronous. The processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons.

The neural network architecture 200 is a type of feed-forward artificial neural network in which the connectivity pattern between its neurons is inspired by the organization of the animal visual cortex. The neural network architecture 200 is formed by a stack of distinct layers that transform the input volume into an output volume (e.g. holding the class scores) through a differentiable function. A few distinct types of layers may be used, such as convolutional layers, pooling layers, rectified linear unit ("ReLU") layers, fully connected layers, and/or loss layers. Optionally, "deconvolutional" layers may be used.

In an exemplary embodiment, the neural network architecture 200 includes a plurality of convolutional layers 210, a plurality of pooling layers 220, at least one fully connected layer 230 downstream of the convolutional layers 210 and the pooling layers 220, at least one random noise generation layer 240 downstream of the convolutional layers 210 and the pooling layers 220, and at least one output layer 250 downstream of the at least one random noise generation layer 240. In an exemplary embodiment, the neural network architecture 200 is a VGG neural network. In various embodiments, the neural network architecture 200 may be a VGG-16 neural network.

The convolutional layers 210 are core layers in the layered structure of the neural network architecture 200 for detecting and processing input image data. The convolutional layer applies a spatial filter or "kernel" to its input, and is a matrix of weighting factors. The kernel may be of size 3×3 pixels. A kernel or filter is applied to an input image ("convolved" with the input image) by repeatedly performing matrix dot multiplication of the kernel with corresponding receptive field portions of the input image as the kernel moves across the image. Each convolutional layer 210, according to a convolution kernel of a fixed-size, performs convolution calculations on the image data which is input to the current convolutional layer, and the result of the convolution calculations is transmitted to the next convolutional layer. The hierarchical relationship of the multiple convolutional layers 210 in the neural network architecture 200 may be a sequential relationship. For example, in the process of image processing in the neural network architecture 200, the first convolutional layer 210 performs convolutional calculations on the input image data and transmits the processed data to the second convolutional layer 210. The second convolutional layer performs convolutional calculations on the received image data, and outputs the processed data to the third convolutional layer 210, and so on.

The pooling layers 220 are arranged after different convolutional layers 210, such as after two convolutional layers 210 or after three convolutional layers 210. The pooling layers 220 are spaced from each other. For example, in the illustrated embodiment, the pooling layers 220 are provided after each of the second, fourth, seventh, tenth and thirteenth convolutional layers 210. The pooling layers 220 are used for compressing image data. For example, the pooling layer applies a spatial filter to its input, however, unlike a typical convolutional layer, the pooling layer downsamples its input to produce an output of lesser spatial dimensions. One exemplary function that can be used for downsampling is a "max" function that takes the maximum value of the receptive field. Another exemplary function is to take the average value of the receptive field. After the final pooling layer 220, the neural network architecture 200 includes two fully connected layers 230. The fully connected layers are used for mapping the image data. The fully connected layer has each pixel connected to all the pixels of the preceding layer, so that its receptive field includes the entire input data. In practice, this means that a fully connected layer has pixel size 1×1. Optionally, the neural network architecture 200 may include one or more ReLU layers, which applies a non-linear function to the pixels of the preceding layer. The result is to produce an output of the same dimensions as the preceding (input) layer, but with more non-linearity. The increased non-linearity enhances the speed of machine learning.

The random noise generation layer 240 is located downstream of the last pooling layer 220. In the illustrated embodiment, the random noise generation layer 240 is located downstream of the fully connected layers 230. The random noise generation layer 240 is used for noise regulation in the model. The random noise generation layer 240 generates random noise in the models to help training and learning. The random noise generation layer 240 may be an input layer to add noise to input variables directly. Alternatively, the noise can be added between hidden layers in the model or added after the activation function. The noise generated by the random noise generation layer 240 allows the part inspection module 150 to generalize the data to provide more robust and varied data for learning and training. The random noise generation layer 240 allows the part inspection module 150 to train more quickly by varying the training parameters. The part inspection module 150 achieves high accuracy using fewer test images and testing iterations using the random noise generation layer 240. The random noise generation layer 240 is a form of random data augmentation used during training to mitigate overfitting of the data. In an exemplary embodiment, the random noise generation layer 240 includes a Gaussian noise layer 242. Additionally, or alternatively, the random noise generation layer 240 may include a drop out layer 244 and/or a batch normalization layer 246. Other types of regularization layers may be used in alterative embodiments.

In an exemplary embodiment, the neural network architecture 200 includes a transformation layer 260 between the random noise generation layer 240 and the output layer 250. The transformation layer 260 uses an activation function to map resulting values of the image analysis through the neural network architecture to an output between known values, such as between 0 and 1 or between −1 and 1. The transformation layer 260 may be a linear transformation or a non-linear transformation. In an exemplary embodiment, the transformation layer 260 uses a logistic activation function, such as a Sigmoid activation function or a Tanh activation function.

In an exemplary embodiment, the output layer 250 provides an output relating to the defectiveness of the part 102. In an exemplary embodiment, the output provided by the output layer 250 is usable by the controller 130 and/or the operator to determine next steps for the part 102. For example, the output may relate to if the part is useable or needs to be scrapped. In an exemplary embodiment, the output may be one of two different outputs. For example, the output may relate to pass/fail or good/bad. In an exemplary embodiment, the output layer 250 is a binary output layer having a 0 representing the non-defective output (PASS) and a 1 representing the defective output (FAIL), or vice versa. The output from the output layer 250 may be based on the data from the transformation layer 260. For example, the transformation layer 260 may have an output as a decimal between 0 and 1 (for example, 0.28 or 0.64), which serves as the input for the output layer 250. The output layer 250 uses such input to generate the final output of the neural network architecture 200 as either a 0 or a 1. In an exemplary embodiment, the output layer 250 may map the inputs from 0.0-0.49 to a 0 (PASS) and may map the inputs from 0.5-1.0 to a 1 (FAIL). The threshold (for example, 0.5) may be adjusted to another value in alternative embodiments to make greater parts identified as defective or to make greater parts identified as non-defective. If greater parts are identified as defective, there is increased scrap but a reduction in defective parts being used for assembly or being sent to customers. If greater parts are identified as non-defective, there is reduced scrap but a higher risk that defective parts are used for assembly or sent to customers. The weighting of the threshold may be adjusted depending on the particular circumstances.

In an exemplary embodiment, the neural network architecture 200 used for detecting burrs 108 in cross holes 104 with high accuracy. The neural network architecture 200 includes stacks of convolutional layers 210 which are pooled by the pooling layers 220 to extract the most important information in a tile of feature maps. The pooled features are flattened into vector before passing the features through two dense layers (for example, the fully connected layers 230). The random noise generation layer 240 (for example, the Gaussian noise layer 242) is added to stop the neural network from overfitting and to enable the neural network architecture 200 to generalize two unseen images. The random noise generation layer 240 ensures the validation loss is less than the training loss. The neural network architecture 200 is robust in detecting defects in new images. The neural network architecture 200 has a low learning rate to allow for quick convergence of the network weights. The neural network architecture 200 may be trained by retraining only the weights in the downstream set(s) of convolutional layers 210, such as only retraining the weights in the last set of convolutional layers 210. Such an approach ensures that the neural network architecture updates it weights (using back propagation) starting only from the last convolutional layers of freezing the weights of the earlier convolutional layers because the weights of the earlier convolutional layers only learn generic image information do not need to be updated, such as when there are few training images. In an exemplary embodiment, the neural network architecture 200 uses the transformation layer 260 to transform the outputs to desired values, such as values between 0 and 1. The output layer 250 uses a function to map the transformed outputs to either PASS or FAIL outputs, such as using a binary output. the neural network architecture 200 may be integrated into a system that uses other architectures for detecting other types of defects.

With additional reference back to FIG. 1, the neural network architecture 200 is implemented by the part inspection module 150, including the one or more memories 152 and the one or more processors 154. The processor 154 is operative to perform exemplary method steps, or in the form of a non-transitory computer readable medium embodying computer executable instructions which when executed by a computer (for example, the controller 130 or a computer 136 employing the controller 130 or operated by the controller 130) cause the computer to perform exemplary method steps. The computer system may be a cloud computing node. Examples of well-known computing systems, environments, and/or configurations that may be suitable for operation of the neural network architecture 200 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. One or more embodiments can make use of software running on a general purpose computer or workstation.

In an exemplary embodiment, the controller 130 receives the output from the part inspection module 150. For example, the controller 130 may receive either a 0 or a 1, indicating PASS or FAIL, respectively. In an exemplary embodiment, the output is used by the controller 130 for other control functions of the part inspection system 100. For example, the controller 130 may cause the part to be moved after receiving the output. The controller 130 may control the manipulator 116 to move the part out of the inspection station 110. In various embodiments, the controller 130 may cause the part to move to one direction/location/bin/machine/station if passing and cause the part to move to a different direction/location/bin/machine/station is failing. In other various embodiments, the controller 130 is coupled to a user interface 132. The user interface 132 may include an indicator 134 to indicate to the operator the status of the output. For example, the indicator 134 may include a display and/or a visual indicator and/or an audible indicator to indicate to the operator the status (for example, PASS/FAIL). The operator may then manually discard the defective parts.

During operation of the neural network architecture 200, the part inspection module 150 runs programs to analyze the image. For example, the part inspection module 150 operates programs stored in the memory 152 on the processor 154. The processor 154 may include computer system executable instructions, such as program modules, being executed by a computer system. Generally, program modules may include routines, programs, objects, components, logic, data structures, and so on that perform particular tasks or implement particular abstract data types. The computing may be practiced in distributed cloud computing environments where tasks are performed by remote processing devices that are linked through a communications network. In a distributed cloud computing environment, program modules may be located in both local and remote computer system storage media including memory storage devices.

In an exemplary embodiment, various components may be communicatively coupled by a bus 156, such as the memory 152 and the processors 154. The bus 156 represents one or more of any of several types of bus structures, including a memory bus or memory controller, a peripheral bus, an accelerated graphics port, and a processor or local bus using any of a variety of bus architectures.

The part inspection module 150 may include a variety of computer system readable media. Such media may be any available media that is accessible by the part inspection module 150, and it includes both volatile and non-volatile media, removable and non-removable media. The memory 152 can include computer system readable media in the form of volatile memory, such as random access memory (RAM) and/or cache memory. The part inspection module 150 may further include other removable/non-removable, volatile/non-volatile computer system storage media. By way of example only, a storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 156 by one or more data media interfaces. The memory 152 may include at least one program product having a set (e.g., at least one) of program modules that are configured to carry out the functions of embodiments of the invention.

One or more programs may be stored in the memory 152, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the subject matter described herein.

The part inspection module 150 may also communicate with one or more external devices, such as through the controller 130. The external devices may include a keyboard, a pointing device, a display, and the like; one or more devices that enable a user to interact with system; and/or any devices (e.g., network card, modem, etc.) that enable the system to communicate with one or more other computing devices. Such communication can occur via Input/Output (I/O) interfaces. Still yet, part inspection module 150 can communicate with one or more networks such as a local area network (LAN), a general wide area network (WAN), and/or a public network (e.g., the Internet) via network adapter. Other hardware and/or software components could be used in conjunction with the system components shown herein. Examples include, but are not limited to: microcode, device drivers, redundant processing units, and external disk drive arrays, RAID systems, tape drives, and data archival storage systems, etc.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 154, memory 152, and input/output interface 158 can be interconnected, for example, via the bus 156 as part of a data processing unit. Suitable interconnections, for example via bus 156, can also be provided to a network interface, such as a network card, which can be provided to interface with a computer network, and to a media interface, such as a diskette or CD-ROM drive, which can be provided to interface with suitable media.

Accordingly, computer software including instructions or code for performing the methodologies of the subject matter herein may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 154. Further, a computer program product can include a computer-readable storage medium with code adapted to be implemented to carry out one or more method steps described herein, including the provision of the system with the distinct software modules.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A part inspection system comprising:
a part support configured to hold a part formed from a metal sheet, the part processed to have a cross hole therethrough, the cross hole open through the metal sheet of the part and defined by an edge passing through the metal sheet of the part, the part support configured to hold the part in an inspection zone;
a vision device at the inspection zone, the vision device having a camera configured to image the cross hole and surrounding areas of the part including any burr defects from the metal sheet extending in the cross hole to generate a digital image of the part;
a part inspection module coupled to the vision device and receiving the digital image of the part, the part inspection module including a memory for storing a neural network architecture having a plurality of convolutional layers, a plurality of pooling layers disposed after different convolutional layers and spaced apart from each other, at least one random noise generation layer downstream of the convolutional layers and the pooling layers, and an output layer, the part inspection module including a processor configured to analyze the digital image through the layers of the neural network architecture to determine if the part includes any burrs from the metal sheet in the cross hole, the processor outputting a defective output if burrs are detected based on the image analysis of the digital image through the neural network architecture, the processor outputting a non-defective output if no burrs are detected based on the image analysis of the digital image through the neural network architecture; and a controller being operably coupled to the vision device to control operation of the vision device, the controller being operably coupled to the part inspection module and receiving the output of the part inspection module, the controller being operatively coupled to a secondary component and sending a signal to the secondary component based on the received output.

2. The part inspection system of claim 1, wherein the at least one random noise generation layer includes a Gaussian noise generation layer.

3. The part inspection system of claim 1, wherein the at least one random noise generation layer includes a batch normalization layer.

4. The part inspection system of claim 1, wherein the at least one random noise generation layer includes a random neuron drop out layer.

5. The part inspection system of claim 1, wherein the output layer is a binary output layer having a 0 representing the non-defective output and a 1 representing the defective output.

6. The part inspection system of claim 1, wherein the neural network architecture includes a transformation layer between the at least one random noise generation layer and the output layer, the transformation layer using an activation function to map resulting values of the image analysis through the neural network architecture to an output between 0 and 1.

7. The part inspection system of claim 1, wherein the neural network architecture includes a VGG neural network.

8. The part inspection system of claim 1, wherein the neural network architecture includes a VGG-16 neural network.

9. The part inspection system of claim 1, wherein the secondary component is an actuator configured to move the part, the signal from the controller causing the actuator to move the part differently dependent on the received output.

10. The part inspection system of claim 1, wherein the secondary component is a user interface having an indicator, the signal from the controller causing the indicator to operate differently dependent on the received output.

11. A part inspection method for imaging a part formed from a metal sheet and processed to have a cross hole therethrough, the cross hole open through the metal sheet of the part and defined by an edge passing through the metal sheet of the part, the part inspection method comprising:

imaging a part using a vision device to generate a digital image of the part at the cross hole and surrounding areas of the part including any burr defects from the metal sheet extending in the cross hole;

analyzing the digital image through a neural network architecture including a plurality of convolutional layers, a plurality of pooling layers disposed after different convolutional layers and spaced apart from each other, at least one random noise generation layer downstream of the convolutional layers and the pooling layers, and an output layer;

outputting one of a defective output or a non-defective output based on the image analysis of the digital image through the neural network architecture, wherein the defective output is output if burrs are detected based on the image analysis of the digital image through the neural network architecture, and wherein the non-defective output is output if no burrs are detected based on the image analysis of the digital image through the neural network architecture.

12. The part inspection method of claim 11, wherein said analyzing the digital image through the neural network architecture includes analyzing the digital image through a Gaussian noise generation layer of the at least one random noise generation layer.

13. The part inspection method of claim 11, wherein said analyzing the digital image through the neural network architecture includes analyzing the digital image through a transformation layer between the at least one random noise generation layer and the output layer, the transformation layer using an activation function to map resulting values of the image analysis through the neural network architecture to an output between 0 and 1.

14. The part inspection method of claim 11, wherein said outputting one of the defective output or the non-defective output includes outputting a binary output layer having a 0 representing the non-defective output and a 1 representing the defective output.

15. The part inspection method of claim 11, further comprising controlling a secondary component based on the output from the output layer to move the part, the secondary component moving the part differently dependent on the received output.

16. The part inspection method of claim 11, further comprising controlling a secondary component based on the output from the output layer to indicate to an operator the output, the secondary component operating differently dependent on the received output.

* * * * *